(12) United States Patent
Kindschuh

(10) Patent No.: US 6,206,521 B1
(45) Date of Patent: Mar. 27, 2001

(54) EYEWEAR THAT SIMULATES BODILY IMPAIRMENTS

(76) Inventor: Curtis S. Kindschuh, 377 Grant St., Fond du Lac, WI (US) 54935

( * ) Notice: Subject to any disclaimer, the term of this patent is extended or adjusted under 35 U.S.C. 154(b) by 0 days.

(21) Appl. No.: 09/390,985

(22) Filed: Sep. 7, 1999

Related U.S. Application Data

(60) Provisional application No. 60/121,677, filed on Feb. 25, 1999.

(51) Int. Cl.[7] .............................. G02C 7/02; G02B 3/08; G09B 19/00
(52) U.S. Cl. ......................... 351/175; 351/177; 359/742; 434/258
(58) Field of Search ................................... 351/175, 177, 351/203; 359/742; 434/258

(56) References Cited

U.S. PATENT DOCUMENTS 4,353,621 * 10/1982 Geer et al. ........................... 359/482
4,698,564 10/1987 Slavin .
5,362,238 11/1994 Slavin .

* cited by examiner

Primary Examiner—Georgia Epps
Assistant Examiner—David N. Spector
(74) Attorney, Agent, or Firm—Donald Cayen

(57) ABSTRACT

The eyewear of the invention causes a person to perceive nearby objects as being distorted such that the person cannot perform simple tasks. The eyewear comprises a goggle with an opening that spans both eyes of the person. A fresnel lens is used to produce an eyepiece that fills the goggle opening. Different distortion effects are perceived depending on the particular area of the fresnel lens from which the eyepiece is produced. The eyewear is particularly useful as an educational tool that simulates intoxication and other bodily impairments.

22 Claims, 3 Drawing Sheets

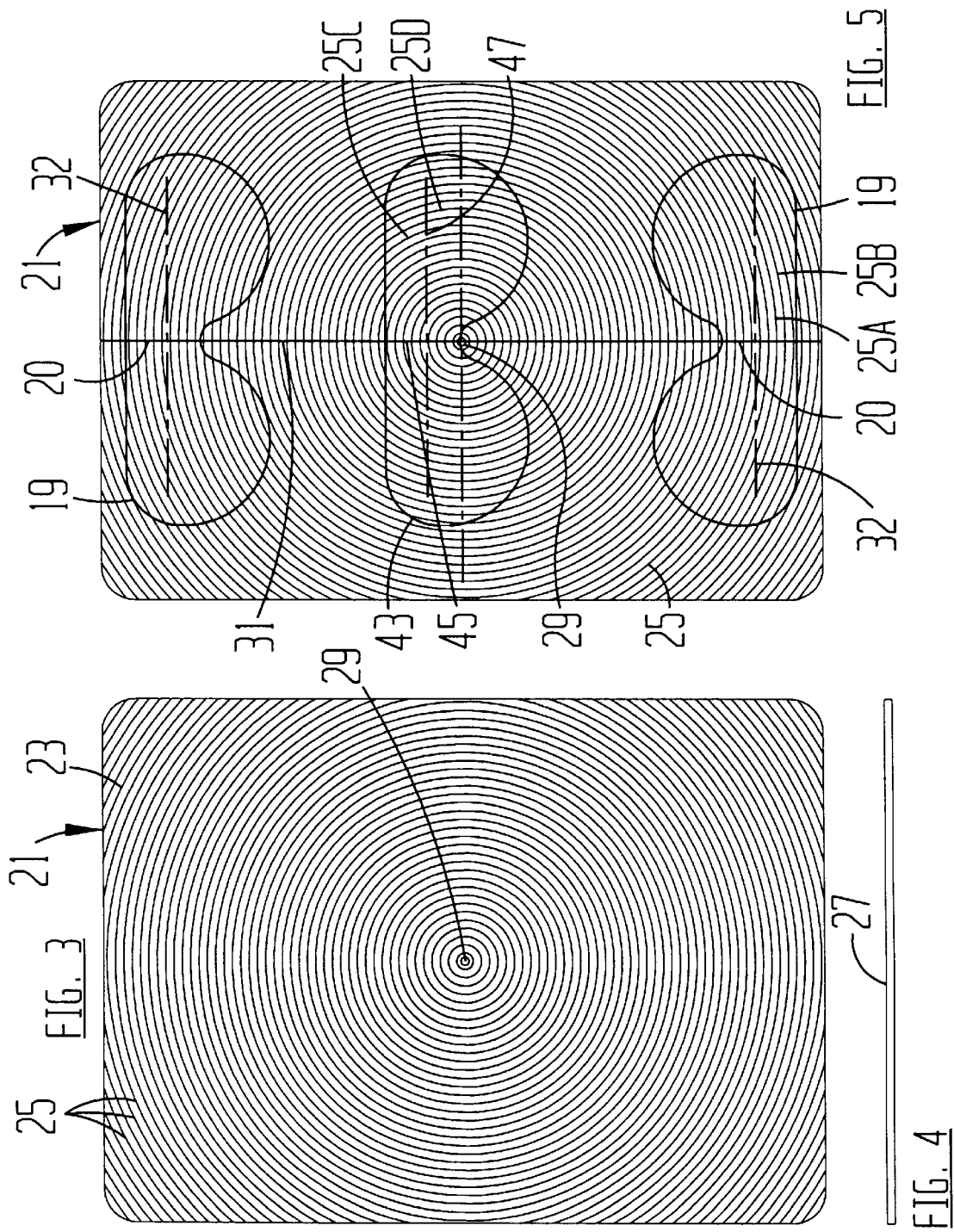

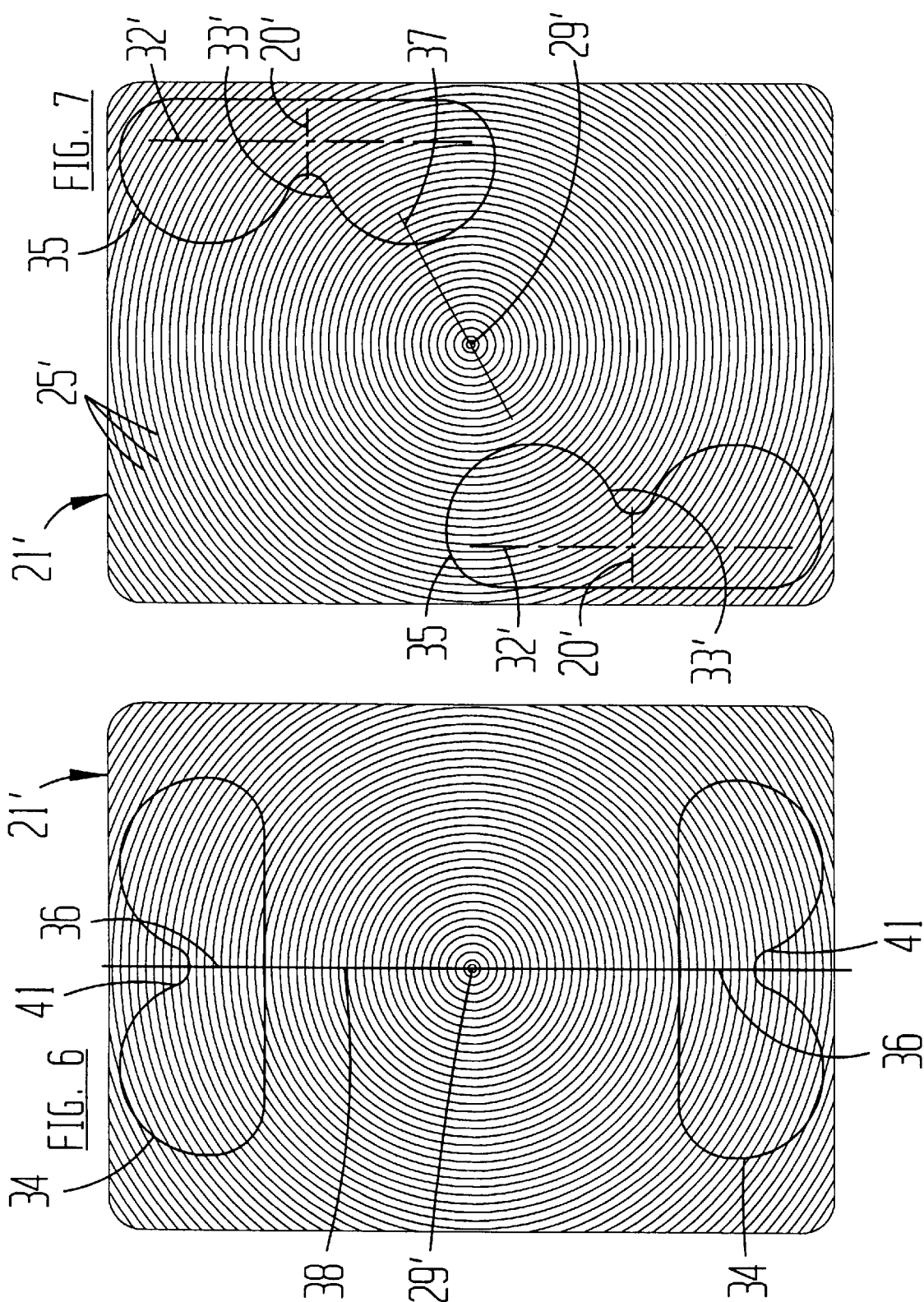

EYEWEAR THAT SIMULATES BODILY IMPAIRMENTS

This is a continuation-in-part of U.S. patent application Ser. No. 60/121,677 filed Feb. 25, 1999.

BACKGROUND OF THE INVENTION

1. Field of the Invention

This invention pertains to human activities, and more particularly to apparatus that mimics the causes of inability to perform selected common actions.

2. Description of the Prior Art

The detrimental effects of intoxication on the ability of persons to perform common activities is well known. For example, major efforts have been made for years to rid the highways of intoxicated drivers.

A vital part of law enforcement involves educating drivers about the dangers of driving when intoxicated. As part of such educational programs, various types of equipment have been developed that simulate intoxication. An example of a prior educational aid is a pair of goggles with eyepieces that deceive the wearer as to the actual locations of objects he is viewing. When the person wears the prior goggles, he perceives his surroundings as being displaced from their actual locations. Consequently, the person becomes disoriented and is unable to perform such simple activities as walking in a straight line. Examples of prior eyewear that induce disorientation may be seen in U.S. Pat. Nos. 4,522,474; 4,698,564; and 5,362,238.

The eyewear of the foregoing patents employs two separate eyepieces made from fresnel lenses with straight light refracting prisms. The prior eyewear shifts the apparent locations of objects as perceived by the wearer relative to their actual locations. Depending on the orientation of the refracting prisms in the eyewear, the objects are perceived as being up, down, or to one side of their true locations relative to the wearer. However, the products of the foregoing patents produce little, if any, actual distortion of the perceived objects. After a relatively short time wearing the eyewear, a person becomes acclimated to the perceived shift in location. The impairment effect of the eyewear is thus reduced.

The Pacific Science Center And Group Health Cooperative, under a grant from the National Institutes of Health/National Center For Research Resources, has designed a visual perception curriculum entitled "Brain Power It's All In Your Head." The Pacific Science Center curriculum employs fresnel lenses as a tool for disorienting persons. Two separate small eyepieces made from the corners of a fresnel lens are used. The refracting prisms of the fresnel lens may be curved. The refracting prisms of both eyepieces are parallel to each other. Because of the short lengths of the refracting prisms in each eyepiece, a person perceives objects as being only displaced from their true locations. In fact, the Pacific Science Center curriculum specifically instructs persons using its described eyewear to readjust it if distortions are perceived.

As further background, intoxication simulation apparatus that does not involve eyewear is shown in U.S. Pat. Nos. 3,918,176 and 4,058,911. U.S. Pat. Nos. 5,777,717 and 5,867,247 disclose eyeglasses that simulate visual anomalies that may result from eye surgery.

Despite the availability of existing equipment that produces visual displacements to a person for simulating intoxication and other incapacities, further development is desirable.

SUMMARY OF THE INVENTION

In accordance with the present invention, eyewear is provided that simulates selected bodily impairments by causing a person to perceive nearby objects as being distorted. This is accomplished by apparatus that includes an eyepiece made from a fresnel lens having curved refracting prisms that span both eyes of the person.

The eyewear is comprised of a goggle having a frame that is worn on a person's face. The goggle eyepiece spans both eyes and is symmetrical about a transverse centerline. The eyepiece is retained around its periphery in the goggle frame.

The fresnel lens from which the goggle eyepiece is made is in the shape of a flat transparent sheet. There are multiple closely spaced circular light refracting prisms on one side of the sheet. The refracting prisms are concentric about a center.

According to one aspect of the invention, the eyepiece is produced from the fresnel such that the eyepiece transverse centerline coincides with a straight line through the center of the fresnel lens. Accordingly, the refracting prisms of the eyepiece are symmetrical about the eyepiece transverse centerline. Preferably, the eyepiece is produced from an area of the fresnel lens at which the refracting prisms have the largest diameter, i.e., close to the edge of the fresnel lens sheet. As a result, many of the refracting prisms span the entire length of the eyepiece.

To protect the eyepiece, a cover of a clear material can be inserted in the goggle frame over the eyepiece. The clear cover is retained around its periphery in the goggle frame in the same manner as the eyepiece.

When the eyewear of the invention is worn by a person, he sees the objects around him in a distorted fashion. One eye perceives the objects as being shifted both vertically and horizontally relative to their true positions relative to the person. In addition, because of the curvature of the long refractive prisms, the objects are perceived as being misshapen. The person's second eye perceives the objects as being shifted in the same vertical direction, but in the opposite horizontal direction, as the first eye. The objects also appear to be misshapen to the second eye. When the person uses both eyes, his brain perceives double images that are both displaced in opposite directions and that are misshapen. The person wearing the eyepiece cannot satisfactorily perform even very simple tasks such as walking a straight line. The eyewear thus simulates bodily impairments similar to those produced by intoxication. The eyewear is an excellent aid for teaching persons of the dangers of driving automobiles and operating other machines while intoxicated.

In a modified embodiment, the eyepiece is produced from near the center of a fresnel lens. The eyepiece transverse centerline is coincident with a straight line through the center of the fresnel lens. Further embodiments include eyepieces in which the transverse centerlines are not coincident with any straight line through the fresnel lens center. The nature of the visual distortions perceived by a person varies depending on the particular area of the fresnel lens from which the eyepiece is produced. For all eyepiece constructions, however, bodily activities are severely impaired.

The method and apparatus of the invention, using a single eyepiece made from a fresnel lens, thus enables persons to safely experience the effects of intoxication. The visual distortions produced by the eyewear of the invention are temporary and can be terminated at will, even though the distortions are both realistic and economical to produce.

BRIEF DESCRIPTION OF THE DRAWINGS

FIG. 3 is a front view of a fresnel lens suitable for producing an eyepiece according to the invention.

FIG. 4 is an end view of FIG. 3.

FIG. 5 is a front view of the fresnel lens of FIGS. 3 and 4 marked with the outlines of eyepieces according to the present invention.

FIG. 6 is a front view of the fresnel lens of FIGS. 3 and 4 marked with the outlines of alternative eyepieces according to the present invention.

FIG. 7 is a front view of the fresnel lens of FIGS. 3 and 4 marked with the outlines of alternate embodiments of the eyepiece of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
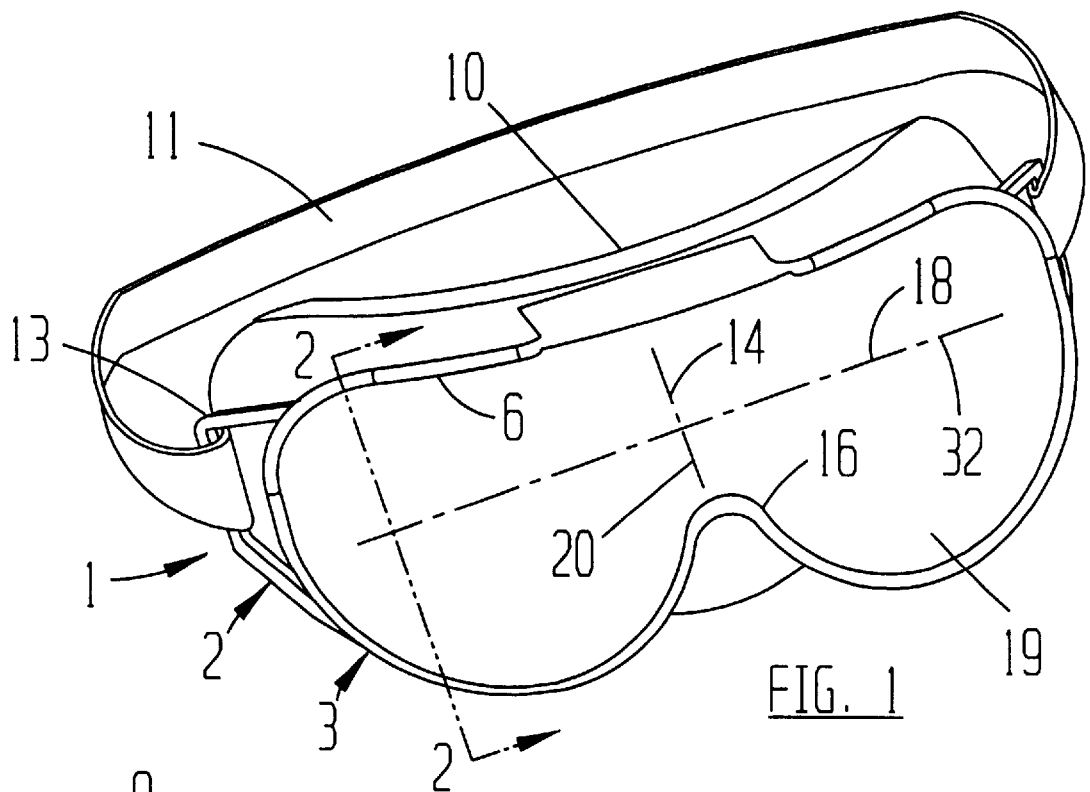
FIG. 1 is a perspective view of the eyewear of the present invention.
Figure 2:
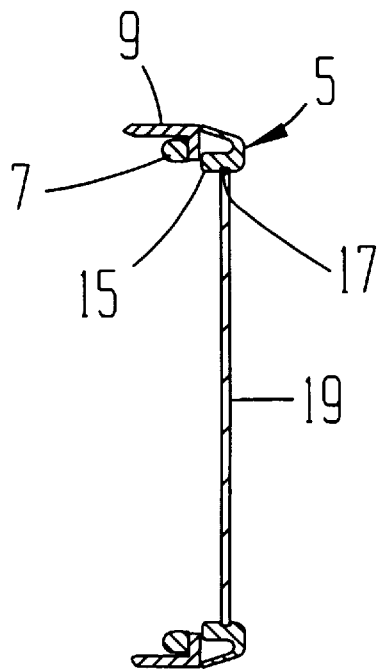
FIG. 2 is a cross-sectional view taken along line 2—25 2 of FIG. 1.

Referring to FIGS. 1 and 2, eyewear 1 according to the present invention is illustrated. In the preferred embodiment, the eyewear 1 is in the form of a goggle 2 comprised of a frame 3 made of a semi-rigid material. The frame 3 has a main section 5 and a clamp section 7. The frame main section 5 surrounds and defines an opening 6. A protective shield 9 is clamped between the main section 5 and the clamp section 7. The shield 9 is configured with a contour 10 to fit the face of a person wearing the goggle 2. A band 11 is connected to the shield, such as by three-sided rings 13. In the inside surface 15 of the frame main section is a shallow groove 17.

The frame opening 6 is long enough to span both eyes of a person wearing the goggle 2. The frame opening defines a transverse centerline 14 and a longitudinal centerline 18. A nose section 16 is generally symmetrical about the transverse centerline 14. When the goggle is worn, the transverse centerline is approximately midway between the eyes of the wearer. An example of a suitable goggle frame is item number U002720000 made by U.S. Safety Company of Lenexa, Kans.

In accordance with the present invention, the eyewear 1 includes a distortion producing eyepiece 19 retained in the frame groove 17. The eyepiece 19 fills the entire frame opening 6. The eyepiece has a longitudinal centerline 32 that is coincident with the longitudinal centerline 18 of the goggle opening 6, and a transverse centerline 20 that is coincident with the opening transverse centerline 14.

The eyepiece 19 is produced from a fresnel lens. Looking also at FIGS. 3 and 4, a typical fresnel lens 21 is shown in simplified fashion. The fresnel lens 21 is made of a thin flexible sheet 23 of transparent plastic material. A large number of light refracting prisms 25 are formed on one side 27 of the sheet 23. The refracting prisms 25 are very small triangles in cross section. The refracting prisms extend lengthwise in closely spaced circles concentric about a center 29. A suitable fresnel lens is marketed by Ultra Optix, Inc. of East Haven, Conn., under model HLP-10.

In FIG. 5, a pair of preferred eyepieces 19 are shown in outline on the fresnel lens 21. The transverse centerline 20 of each eyepiece is coincident with a straight line 31 through the fresnel lens center 29. Although the eyepieces can be anywhere along the line 31, the eyepieces 19 are at the maximum distance from the fresnel lens center. In that situation, the longitudinal centerline 32 of each eyepiece is generally parallel to the fresnel lens refracting prisms 25 that are present in the eyepiece. Further, many of the refracting prisms, such as refracting prisms 25A and 25B, span the entire length of the eyepiece. Further, the refracting prisms 25A and 25B, as well as adjacent refracting prisms, are generally parallel to the eyepiece longitudinal centerline 32.

The eyepiece 19 is carefully cut from the fresnel lens 21 such that the eyepiece can fit in the goggle frame groove 17 (FIG. 2). The semi-rigid material of the frame main section 5 enables the groove to be manually opened slightly to insert the eyepiece, but the material recloses the groove after the eyepiece is in place. The side 27 of the fresnel lens with the refracting prisms is preferably placed toward the inside of the goggle frame 3.

When a person wears the eyewear 1, he sees the objects around him as being distorted. The distortion includes both a displacement of the objects from their true positions, and also as being misshapen relative to their true shapes. The displacements seen by each eye of the wearer are generally symmetrical about the eyepiece transverse centerline 20. For the eyepiece 19, the perceived displacements are vertically upward and slightly to the opposite sides of the transverse centerline 20. In addition, the curvatures of the long refracting prisms 25 cause the wearer to perceive the objects as being misshapen. The result is a sensation of dizziness, together with greatly diminished eye-hand coordination. For practical purposes, the person is impaired from making many otherwise simple movements. The eyewear is particularly useful as a safety related teaching aid, because it harmlessly simulates the impairment a person would have under the influence of alcohol or drugs. A person who has worn the goggle is therefore much less inclined to later abuse alcohol or drugs, because he knows in advance the effects they would have on his ability to function properly.

The particular distortion perceived by a person wearing the eyewear 1 can be varied depending on the particular area of the fresnel lens 21 from which the eyepiece is taken. In FIG. 5, the eyepieces 19 are shown with their nose cutouts 33 as facing the fresnel lens center 29. However, if desired, the eyepieces can be reversed on the fresnel lens. That is, the eyepieces can be produced with the nose cutouts facing away from the fresnel lens center. For example, FIG. 6 shows a fresnel lens 21' marked with the outlines of two eyepieces 34 having respective transverse centerlines 36. The transverse centerlines 36 of the eyepieces 34 are coincident with a straight line 38 through the center 29' of the fresnel lens 21'. The nose cutouts 41 of the eyepieces 34 face away from the fresnel lens center 29'.

Returning to FIG. 5, a further alternate eyepiece 43 is shown in outline on the fresnel lens 21. The eyepiece 43 has a transverse centerline 45 that is coincident with a straight line 31 through the center 29 of the fresnel lens. The eyepiece 43 is produced from an area of the fresnel lens near its center 29 such that the refracting prisms, such as prisms 25C and 25D, are generally perpendicular to the eyepiece longitudinal centerline 47. When a person wears an eyewear containing the eyepiece 43, he perceives nearby objects as being displaced oppositely and generally horizontally with little vertical displacement. Thus, different types of distortions can be produced from a single fresnel lens by varying the area of the fresnel lens from which the eyepiece is produced.

Now turning to FIG. 7, modified eyepieces 35 are shown outlined on a fresnel lens 21'. The eyepieces 35 have respective nose cutouts 33' and transverse centerlines 20'. The transverse centerlines 20' of the eyepieces 35 are not coincident with any straight line, such as line 37, through the lens center 29'. As a result, the fresnel lens refracting prisms 25' are not symmetrical about the eyepiece transverse centerline 20'. When installed in the goggle 2 and worn, the person perceives distortions that are not symmetrical about either the transverse centerline 20' or the longitudinal centerline 32'.

Figure 8:
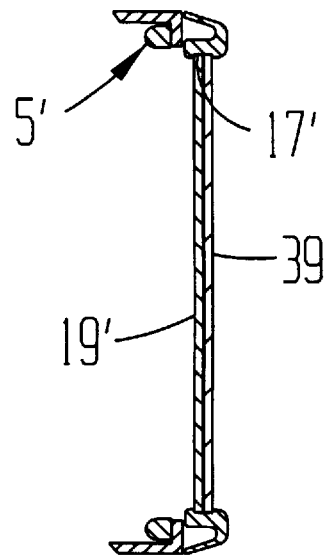
FIG. 8 is a view similar to FIG. 2, but showing a protective cover used with an eyepiece.

According to another aspect of the invention, the eyewear can include a protective cover over the eyepiece. Looking at FIG. 8, a frame 5' has a groove 17' that holds an eyepiece 19'. A transparent cover 39 of the same size and shape as the eyepiece 19' is fit in the groove 17' together with the eyepiece. The cover 39 protects the eyepiece against scratches and similar damage.

In summary, the dangers of bodily impairments through intoxication and similar causes can now be more fully and safely simulated. The eyewear of the invention provides both the equivalent of temporary impairment as well as the incentive to avoid such impairment. This desirable result comes from using the combined functions of the eyepiece. The eyepiece is produced from a fresnel lens and causes a person to see surrounding objects in a distorted manner, which renders him unable to perform even simple manual tasks. The distortions can be varied to suit different user requirements or to prevent a person from becoming acclimated to a particular distortion pattern. The different distortions are perceived by a person depending on the particular area of the fresnel lens that is used to produce the eyepiece. The eyepiece fits into a goggle frame in a simple manufacturing process. A transparent cover can be used in the eyewear to protect the eyepiece.

It will also be recognized that in addition to the superior performance of the eyewear of the invention, its construction is such as to be of very modest cost in relation to the benefits it provides. In fact, compared with the social costs of intoxication and similar impairments, the cost associated with the prevention of problems associated with such impairments is negligible. Also, because the eyewear has a simple design and rugged construction, it gives long service life with virtually no maintenance.

Thus, it is apparent that there has been provided, in accordance with the invention, eyewear that simulates bodily impairment that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Eyewear that simulates selected bodily impairments comprising:
   a. a goggle worn over a person's face comprising:
      i. a frame that defines an opening having mutually perpendicular transverse and longitudinal centerlines, the opening spanning the distance between the eyes of the person; and
      ii. an eyepiece retained in and filling the frame opening, the eyepiece having transverse and longitudinal centerlines that coincide with the frame opening transverse and longitudinal centerlines, respectively, the eyepiece being produced from a fresnel lens having a multiplicity of light refracting prisms arranged in concentric circles around a center, the eyepiece causing a person to perceive objects as being distorted when he wears the eyewear on his face; and
   b. a band that removably holds the goggle to the person's face.

2. The eyewear of claim 1 wherein the fresnel lens defines a straight line through the center thereof, and wherein the transverse centerline of the eyepiece produced from the fresnel lens is coincident with the straight line through the center of the fresnel lens.

3. The eyewear of claim 1 wherein:
   a. the fresnel lens defines a multiplicity of straight lines passing through the center thereof; and
   b. the transverse centerline of the eyepiece is not coincident with any of the straight lines passing through the center of the fresnel lens.

4. The eyewear of claim 2 wherein:
   a. the goggle frame defines a nose cutout;
   b. the eyepiece defines a nose cutout contiguous with the goggle frame nose cutout; and
   c. the eyepiece nose cutout is between the eyepiece longitudinal centerline and the center of the fresnel lens from which the eyepiece is produced.

5. The eyewear of claim 2 wherein:
   a. the goggle frame defines a nose cutout;
   b. the eyepiece defines a nose cutout contiguous to the goggle frame nose cutout; and
   c. the eyepiece longitudinal centerline is between the eyepiece nose cutout and the center of the fresnel lens from which the eyepiece is produced.

6. The eyewear of claim 2 wherein the eyepiece longitudinal centerline is generally parallel to the refracting prisms of the fresnel lens from which the eyepiece is produced.

7. The eyewear of claim 2 wherein the eyepiece longitudinal centerline is generally perpendicular to the refracting prisms of the fresnel lens from which the eyepiece is produced.

8. Apparatus that causes a person to temporarily perceive objects as being distorted comprising:
   a. a goggle worn on the face of the person and having an opening therein with a length sufficient to span both eyes of the person, the opening defining transverse and longitudinal centerlines and having a nose cutout; and
   b. an eyepiece retained in the goggle that fills the goggle opening and has transverse and longitudinal centerlines and a nose cutout coincident with the goggle opening transverse and longitudinal centerlines and nose cutout, respectively, the eyepiece being produced from a selected area of a fresnel lens having a multiplicity of refracting prisms arranged in concentric circles about a center, the eyepiece producing visual images to the person's brain that are displaced and misshapen relative to their true locations and shapes, respectively.

9. The apparatus of claim 8 wherein the eyepiece is produced from an area of the fresnel lens such that the eyepiece transverse centerline is coincident with a selected straight line through the center of the fresnel lens.

10. The apparatus of claim 9 wherein the eyepiece nose cutout is between the eyepiece longitudinal centerline and the center of the fresnel lens.

11. The apparatus of claim 9 wherein the eyepiece is produced from an area of the fresnel lens such that a multiplicity of the refracting prisms are generally parallel to the eyepiece longitudinal centerline.

12. The apparatus of claim 9 wherein the eyepiece is produced from an area of the fresnel lens such that a multiplicity of the refracting prisms are generally perpendicular to the eyepiece longitudinal centerline.

13. The apparatus of claim 8 wherein the eyepiece is produced from an area of the fresnel lens such that the eyepiece transverse centerline is not coincident with any straight line passing through the center of the fresnel lens.

14. The apparatus of claim 9 wherein the eyepiece longitudinal centerline is between the nose cutout and the center of the fresnel lens.

15. The apparatus of claim 8 further comprising a transparent cover retained in the goggle adjacent the eyepiece and having the same size and shape as the eyepiece.

16. A method of simulating impairment of a person comprising the steps of:
  a. providing a fresnel lens having a multiplicity of light refracting prisms arranged in concentric circles about a center;
  b. providing a goggle with an opening that spans both eyes of a person and that defines transverse and longitudinal centerlines;
  c. producing an eyepiece from a selected area of the fresnel lens that has the same shape and size as the goggle opening;
  d. retaining the eyepiece in the goggle opening; and
  e. wearing the goggle and eyepiece and thereby causing the person to perceive nearby objects as being displaced and misshapen relative to their true locations and shapes, respectively.

17. The method of claim 16 wherein:
  a. the step of providing a fresnel lens comprises the step of providing a fresnel lens that defines a multiplicity of straight lines through the center thereof; and
  b. the step of producing an eyepiece comprises the step of producing an eyepiece with a transverse centerline that is coincident with a selected one of the straight lines through the center of the fresnel lens.

18. The method of claim 16 wherein:
  a. the step of providing a fresnel lens comprises the step of providing a fresnel lens that defines a multiplicity of straight lines through the center thereof; and
  b. the step of providing a eyepiece comprises the step of providing an eyepiece with a transverse centerline that is not coincident with any of the straight lines through the center of the fresnel lens.

19. The method of claim 16 wherein:
  a. the step of providing a goggle comprises the step of providing a goggle with an opening that has a nose cutout; and
  b. the step of providing an eyepiece comprises the step of providing an eyepiece with a longitudinal centerline and a nose cutout that is between the eyepiece longitudinal centerline and the center of the fresnel lens.

20. The method of claim 16 wherein:
  a. the step of providing a goggle comprises the step of providing a goggle with an opening that has a nose cutout; and
  b. the step of providing an eyepiece comprises the step of providing an eyepiece with a nose cutout and a longitudinal centerline that is between the eyepiece nose cutout and the center of the fresnel lens.

21. The method of claim 16 wherein the step of providing an eyepiece comprises the step of providing an eyepiece that defines a longitudinal centerline that is generally parallel to selected refracting prisms of the fresnel lens.

22. The method of claim 16 wherein the step of providing an eyepiece comprises the step of providing an eyepiece that defines a longitudinal centerline that is generally perpendicular to selected refracting prisms of the fresnel lens.

* * * * *

EX PARTE REEXAMINATION CERTIFICATE (4921st)
United States Patent
Kindschuh

(10) Number: US 6,206,521 C1
(45) Certificate Issued: Mar. 23, 2004

(54) EYEWEAR THAT SIMULATES BODILY IMPAIRMENTS

(75) Inventor: Curtis S. Kindschuh, 377 Grant St., Fond du Lac, WI (US) 54935

(73) Assignee: Curtis S. Kindschuh, Fond du Lac, WI (US)

Reexamination Request:
No. 90/006,178, Jan. 4, 2002

Reexamination Certificate for:
Patent No.: 6,206,521
Issued: Mar. 27, 2001
Appl. No.: 09/390,985
Filed: Sep. 7, 1999

Related U.S. Application Data

(60) Provisional application No. 60/121,677, filed on Feb. 25, 1999.

(51) Int. Cl.[7] .............................. G02C 7/02; G02B 3/08; G09B 19/00
(52) U.S. Cl. ........................ 351/175; 351/177; 359/742; 434/258

(56) References Cited

U.S. PATENT DOCUMENTS 5,362,238 A * 11/1994 Slavin .......................... 434/65

OTHER PUBLICATIONS

"Altering Reality Goggles", Pacific Science Center, pp. 1–2, 1997.*
"The Straight Line: A Sobering View of What Impairment Can Do", Fatal Vision, Innocorp Ltd., Oct. 1997.*

* cited by examiner

*Primary Examiner*—Jordan M. Schwartz

(57) ABSTRACT

The eyewear of the invention causes a person to perceive nearby objects as being distorted such that the person cannot perform simple tasks. The eyewear comprises a goggle with an opening that spans both eyes of the person. A fresnel lens is used to produce an eyepiece that fills the goggle opening. Different distortion effects are perceived depending on the particular area of the fresnel lens from which the eyepiece is produced. The eyewear is particularly useful as an educational tool that simulates intoxication and other bodily impairments.

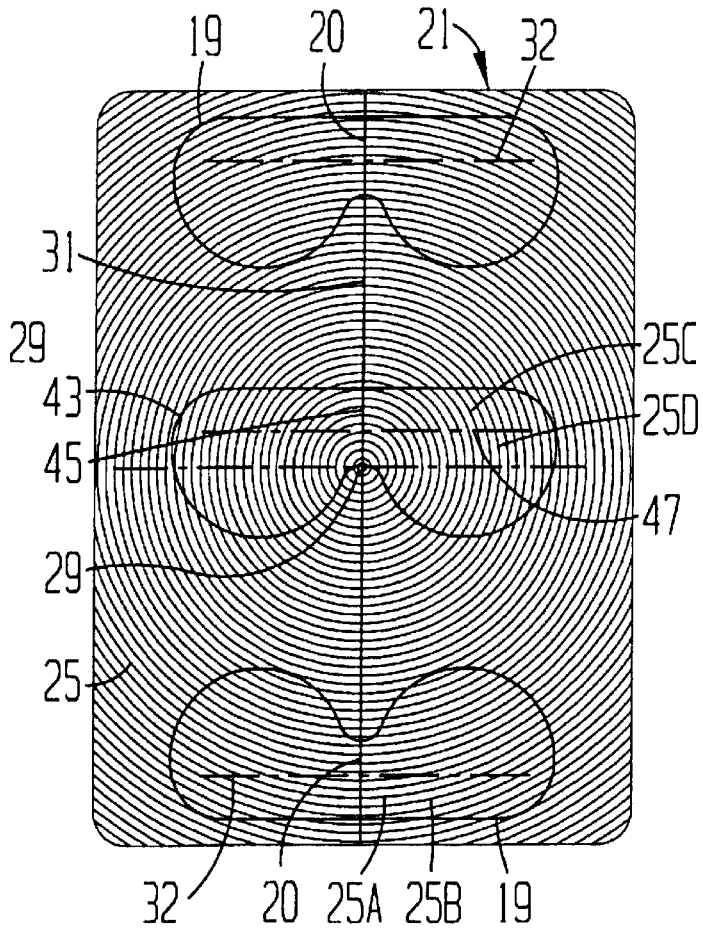

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 4–7, 9–12, 14, 17 and 20 is confirmed.

Claims 1, 3, 8, 13, 15–16, 18–19 and 21–22 are cancelled.

\* \* \* \* \*